A. HEYLAND.
APPARATUS FOR GENERATING HIGH FREQUENCY ELECTRIC CURRENTS.
APPLICATION FILED JULY 28, 1914.

1,417,913.

Patented May 30, 1922.

Witnesses:

Inventor:
Alexander Heyland
by B. Singer Atty.

UNITED STATES PATENT OFFICE.

ALEXANDER HEYLAND, OF BRUSSELS, BELGIUM.

APPARATUS FOR GENERATING HIGH-FREQUENCY ELECTRIC CURRENTS.

1,417,913. Specification of Letters Patent. Patented May 30, 1922.

Application filed July 28, 1914. Serial No. 853,766.

*To all whom it may concern:*

Be it known that I, ALEXANDER HEYLAND, engineer, subject of the German Empire, residing at Brussels, Belgium, have invented certain new and useful Improvements in Apparatus for Generating High-Frequency Electric Currents, of which the following is a specification.

My invention relates to the production of high frequency electric currents by machines in which the frequency is not determined by the number of poles, or the pitch thereof, and the circumferential speed, but by oscillations or pulsations in the field circuits of the machine.

According to my invention, in a machine having, for example, fixed magnets, the gaps between the successive poles of opposite polarity are bridged across the rotor surface by magnetic fluxes in different phases.

The apparatus employed for this purpose is characterised externally by the fact that the active stator and rotor surfaces are differently subdivided in the direction of their movement, and that the iron surface of the rotor forms segments which bridge the gaps between the pole tips successively under different phases.

With the known methods of producing oscillations by means of a rotor differing, in its division, from the pole distribution, pointed or toothed poles and a toothed rotor are always employed to produce a pulsating variation of the magnetic resistance to the flux entering the rotor radially.

Machines of this type have various drawbacks. In the first instance the oscillations within the iron of the rotor are powerfully damped, even if the rotor is well divided, and in this respect the machines are even inferior to unipolar machines having toothed rotors. Secondly, as is the case with unipolar machines, with closely arranged teeth the comb-like distribution of the field is apt to be blurred, and only very weak oscillations are produced. Thirdly, this principle does not allow of any closed windings being placed on the rotor for producing counter ampere turns, since these turns would have a damping effect on the oscillations, so that machines of this type are only capable of very limited outputs.

According to my invention the active rotor iron is disposed solely at the surface of the rotor and always in that segment which bridges the slot separating the pole tips of two stator poles, the segments underneath the stator poles being inactive. The stator field is closed tangentially over the corresponding rotor segments.

It will be seen from this that my arrangement not only obtains the advantage of the counter ampere turns due to the closed windings, but also obtains undamped magnetic oscillations across the face of the individual active rotor segments owing to the fact that the magnetic lines do not penetrate deeply into the body of the iron, this being prevented by the closed windings, and also by the fact that the cross section of the active segments is reduced at a small distance beneath the surface. Also, I do not obtain the objectionable blurring of the field, but a sharp change whenever the edge of an active rotor segment passes from beneath a pole tip, since the magnetic lines are prevented from establishing a new path for themselves from one segment to the other due also to the closed winding.

The open gaps may be filled with copper or any other electric conducting metal or with windings or bars which may be connected in any manner to each other or in themselves. The counter ampere turns produced in the same increase the pulsations on the one hand and on the other hand increase the torque and efficiency of the machine when under load.

The invention is diagrammatically illustrated in the accompanying drawings, in which—

Figs, 1, 1ª, 2, 2ª 3, 3ª, 4 and 4ª show some arrangements by way of example.

In the drawings sections of the stator and rotor are shown developed in a straight line, for the sake of clearness, and the separate figures showing different arrangements as follows:

Figure 1 a diagrammatic view showing the stator poles of equal size and the rotor segments also of equal size and of comparatively large number compared with the number of stator poles, there being only one winding on the stator poles serving to carry both the exciting current and the useful current.

Figure 2 is a diagrammatic view showing the stator poles divided into alternately arranged groups of different sizes, the larger poles carrying an induced winding and the smaller poles carrying an exciting winding, while the active rotor segments are equal in size and approximately the same as the larger stator poles. In Figure 2 the exciting coils are all wound in the same direction on their respective poles in order that the induced poles may be all the same, the arrangement being such that the flux in one induced pole always increases as the flux in the next induced pole is decreasing, the induced windings consequently being wound in opposite directions in order that the impulses may add.

Figure 1:
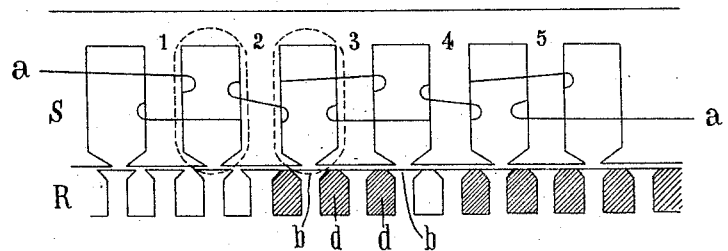

In Figure 1, S designates the stator, and R the rotor.

The poles of the stator are designated by successive numerals 1, 2, 3, 4, 5 and the stator coils are in series and so connected that a current fed to the terminals $a\ a$ produces N and S poles. The rotor has teeth $b, b, b$, the pitch of which is in this example ½ of the pole pitch of the stator. In the position shown the flux passing from pole 3 to the two poles 2 and 4, traverses the surface of the two teeth $b, b$, which magnetically bridge the slots which they face. If now the rotor is considered as having turned ¼ the rotor pitch from the position of Fig. 1, a rotor slot will be opposite a stator slot, so that the bridging is interrupted. Hence only a part of the field is able to close radially and tangentially over the teeth and the inner rotor body, so that the oscillation is weakened. By placing in the rotor slots windings or copper bars $d$, as shown by hatching, which may be connected to each other in any suitable manner, the field in the body of the rotor is practically neutralized by the currents induced in the copper, so that apart from leakage only the part of the field over the faces of the teeth is effective.

The details of design may vary considerably. The number of the rotor conductors may be greater or less than the number of stator divisions, or equal thereto providing that the sizes of the divisions are different, so that they act successively under different positions of the inductors in relation to the poles. The divisions of the stator or rotor may also vary amongst themselves. By this means other new effects may be obtained as hereinafter mentioned more in detail in connection with the description of the other figures.

Figure 2:
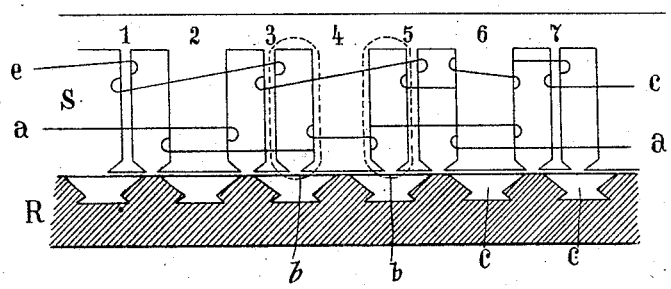

In Figure 2 for instance the stator has divisions of two sizes, in the proportion of 1:2, and the rotor has a division equal to the larger stator division, and twice the size of the small stator division. In the position shown the flux circuit of pole 4 is closed over $b, b$, and the two adjacent poles 5 and 3, whilst the flux circuits of poles 2 and 6 are open. The opposite conditions obtain in the position removed by ½ of the rotor pitch from that of Fig. 2.

In Figure 2, the magnetic bridging is produced by separately inserting bridge pieces $c, c$ as shown on the right hand side. In this case the rest of the rotor body may consist of electrically conductive metals as shown by hatching. The same counter ampere turns as in a short-circuited winding will thus be produced in the solid metals, and will serve on the one hand to annul the rotor dispersion.

If the inductive winding $a—a$ is only placed on the poles 2, 4, 6 etc. and wound in opposite directions on adjacent poles, the induced currents or electromotive forces are added to each other. This is owing to the fact that the flux in a pole such as 2 begins to increase as the flux in a pole such as 4 begins to decrease. The windings must consequently be in different directions in order that the electromotive forces may add. For the purpose of producing excitation the machine must be provided with another winding, the coils of which are so arranged that 1, 3, 5, 7 for instance become N poles, and 2, 4, 6, 8 poles. The flux in the excited poles 1, 3, 5 and 7 is constant in direction and also in quantity since the flux from any pole of this set is able to switch from an induced pole on one side to an induced pole on the other at the time the flux in the first induced pole begins to decrease. In this exciting winding, consequently, no tension will be induced and it is unnecessary, as is the case with other machines having a variable field in the excited poles, to arrange a choking coil in front of the exciting circuit. In poles 2, 4, 6, etc., oscillations occur, first to one side and then to the other. In the poles 1, 3, 5, 7, there are no oscillations at all when using continuous current for excitation and any induced tension can be removed from the exciting circuit by only using these poles for the purpose of exciting, and placing the exciting winding $e—e$ only on alternate poles.

This arrangement may be of practical value if the machine is excited with continuous current at 100 to 200 volts, which may involve a fairly high number of turns per pole and consequently high tensions at the exciting terminals. The constant field in the exciting poles 1, 3, 5, 7 . . . has the advantage that these poles are highly saturated and may consequently have a small cross section, as shown in Figure 2.

In Figure 2 the segments c c are inserted, the rest of the rotor being made in the form of a solid steel bronze wheel, rendering it simple and strong.

Figure 3:
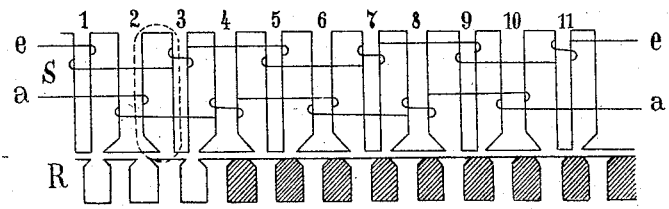
Fig. 3 is a diagrammatic view somewhat similar to Fig. 2, the size of the rotor segments and of the smaller stator pole tips being, however, reduced as compared to the size of the large stator pole tips, with the result that the induced poles are some of one polarity and some of another the exciting coils are connected differently.

In Figure 3 the number of rotor divisions is equal to the number of stator divisions, the stator has divisions of two sizes, alternating with each other and in the proportion of 1:3, and the rotor has a division equal to ⅔ of the larger stator division, that is to say, twice the size of the smaller stator division. In the position shown, the flux circuit of pole 2, for instance, is closed over the pole 3 to the right, and in the position removed by ½ of the rotor pitch it is closed over the pole 1 on the left.

If the inductive winding a—a is again placed for instance only on the poles 2, 4, 6, etc., and the exciting winding e—e on the poles 1, 3, 5, etc., in such manner that 1, 5, 9, etc., are N poles, and 3, 7, 11, etc., S poles, then the induced poles 2, 4, 6 . . . will form alternating poles. For instance, poles 2, 6, 10, etc., will be N poles in the position shown, and in the next position S poles; poles 4, 8, 12, etc., will in the position shown be S poles, and in the next position N poles.

The result is that the induced field in the induction coils of the winding a does not only pulsate but becomes a pure alternating field, and for producing an equal E. M. F. the amplitude of the field oscillation may be reduced to less than half.

For the purpose of wireless telephony or signalling by influencing the exciting circuit, this construction has the advantage that owing to a weaker field being allowable the exciting winding also has a small self-induction and is therefore more easily influenced.

Figure 4:
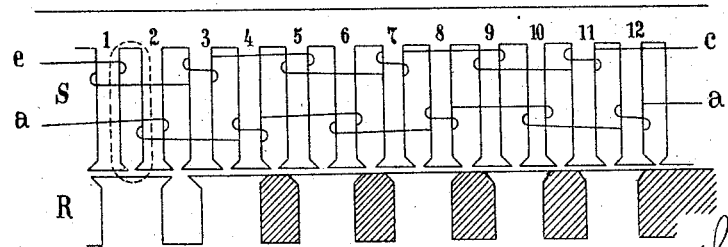
Figure 4 is a diagrammatic view somewhat similar to Figure 3, but showing the stator projection all of the same size and the active rotor segments relatively large as compared with the stator projections.

In Figure 4 the number of rotor divisions is ½ the number of stator divisions. In the position shown the flux circuit of pole 2 is closed over the pole 1 on the left, and in the next position, removed by ½ of a rotor division, the flux circuit is closed over the pole 3 on the right.

In this case again the winding may be divided into two parts, and one part or both may be used for exciting. With similar connections, the conditions are in principle analogous in Figure 4 and Figure 3. The only difference is that owing to the smaller number of rotor divisions, with equal excitation, the field per pole is proportionally larger, and the frequency produced is proportionally less.

The method can be used for producing high or normal frequencies, and in generators as well as in motors, i. e. for converting mechanical energy into electrical energy and vice versa. The rotor may of course be used as the magnet system, and the stator as the armature.

The excitation may be produced by continuous current or by alternating current, or by a pulsating current, for instance for the purpose of wireless telephony.

Finally, known means such as condensers arranged in parallel or in series with the outer circuit, may be used for increasing the oscillation or for other purposes. By this means the fall of pressure occurring with load may be compensated in a particularly simple manner, as the rotor dispersion can be kept at a minimum, and appreciable dispersion only occurs in respect of the stator windings between the pole tips, and the reaction thereof on the pressure can be reduced, to the limit of saturation of the iron, by a condenser of suitable proportions connected in series.

Having now particularly described and ascertained the nature of my said invention and in what manner the same is to be performed, I declare that what I claim is:—

1. An electrical machine comprising in combination a relatively movable field and armature, said field having a plurality of poles, and said armature having its iron surface in the form of segments, said segments being adapted to individually and successively magnetically bridge the pole tips of opposite polarity, and means forming a short circuit around each of said segments.

2. An electrical machine comprising in combination a pole system and an armature system, said armature system presenting a surface in the form of a plurality of segments, each of said segments being adapted to successively magnetically bridge the pole tips of opposite polarity when the centre of the surface of the individual segment is midway between the poles which are bridged thereby, and means forming a short circuit around each of said segments.

3. An electrical apparatus comprising in combination a pole system and an armature system, said armature system presenting a surface in the form of a plurality of segments, and connected conducting metal intermediate said segments, said segments being adapted individually to magnetically bridge the pole tips of opposite polarity.

4. An electrical apparatus comprising in combination a pole system, and an armature system consisting of suitable magnetic pieces, said pieces being surrounded by connected electrically conducting metal and being adapted individually to bridge the pole tips of opposite polarity.

In testimony whereof I have hereunto set my hand in presence of two subscribing witnesses.

ALEXANDER HEYLAND.

Witnesses:
CHAS. ROY NASMITH,
K. J. ZACARY.